(12) United States Patent
Peng

(10) Patent No.: US 8,043,020 B2
(45) Date of Patent: Oct. 25, 2011

(54) COUPLING STRUCTURE OF A TELESCOPIC ROD

(76) Inventor: I-Sin Peng, Taichung (TW)

(*) Notice: Subject to any disclaimer, the term of this patent is extended or adjusted under 35 U.S.C. 154(b) by 158 days.

(21) Appl. No.: 12/505,489

(22) Filed: Jul. 19, 2009

(65) Prior Publication Data

US 2011/0013971 A1    Jan. 20, 2011

(51) Int. Cl.
*F16B 7/10* (2006.01)
(52) U.S. Cl. .................. 403/109.5; 403/109.4
(58) Field of Classification Search .............. 403/109.4, 403/109.5; 440/101
See application file for complete search history.

(56) References Cited

U.S. PATENT DOCUMENTS

| | | | | |
|---|---|---|---|---|
| 2,184,358 A | * | 12/1939 | Moore | 285/302 |
| 3,120,857 A | * | 2/1964 | Fischer et al. | 137/592 |
| 6,544,087 B1 | * | 4/2003 | Peng | 440/101 |
| 6,761,274 B1 | * | 7/2004 | Chen | 211/207 |

* cited by examiner

*Primary Examiner* — Victor MacArthur
(74) *Attorney, Agent, or Firm* — Jackson IPG PLLC; Demian K. Jackson

(57) ABSTRACT

A coupling structure of a telescopic rod includes an inner tube, an outer tuber, and a positioning device. The positioning device includes a rotatable lid, a resilient sleeve, a metallic ring, and a C-shaped sleeve. The C-shaped sleeve has a plurality of mini-ribs formed on an inner wall thereof. The mini-ribs are attached to the inner tube for providing a non-slip effect. The mini-ribs have less resistance with respect to the inner tube to provide a fine adjustment when the inner tube is extended or retracted with respect to the outer tube. An enlarged portion formed at a distal end of the inner tube is adapted to keep a proper gap between the inner tube and the outer tube for enhancing the steadiness of the telescopic rod. The rotatable lid is turned clockwise or counterclockwise for controlling the resilient sleeve, the metallic ring and the C-shaped sleeve to switch the inner tube in an adjustable state or in a fixed state.

5 Claims, 7 Drawing Sheets

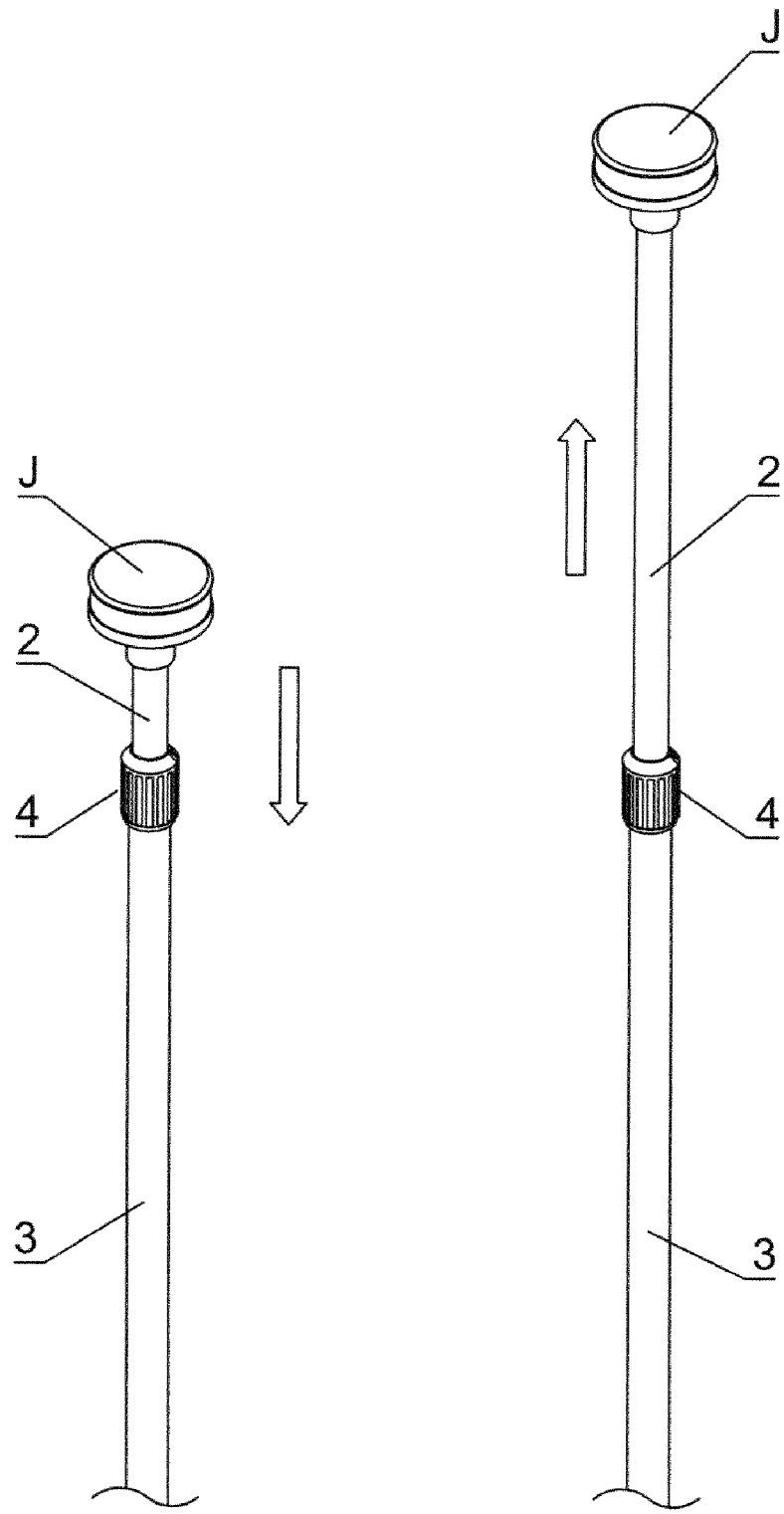
Fig. 6-A    Fig. 6-B

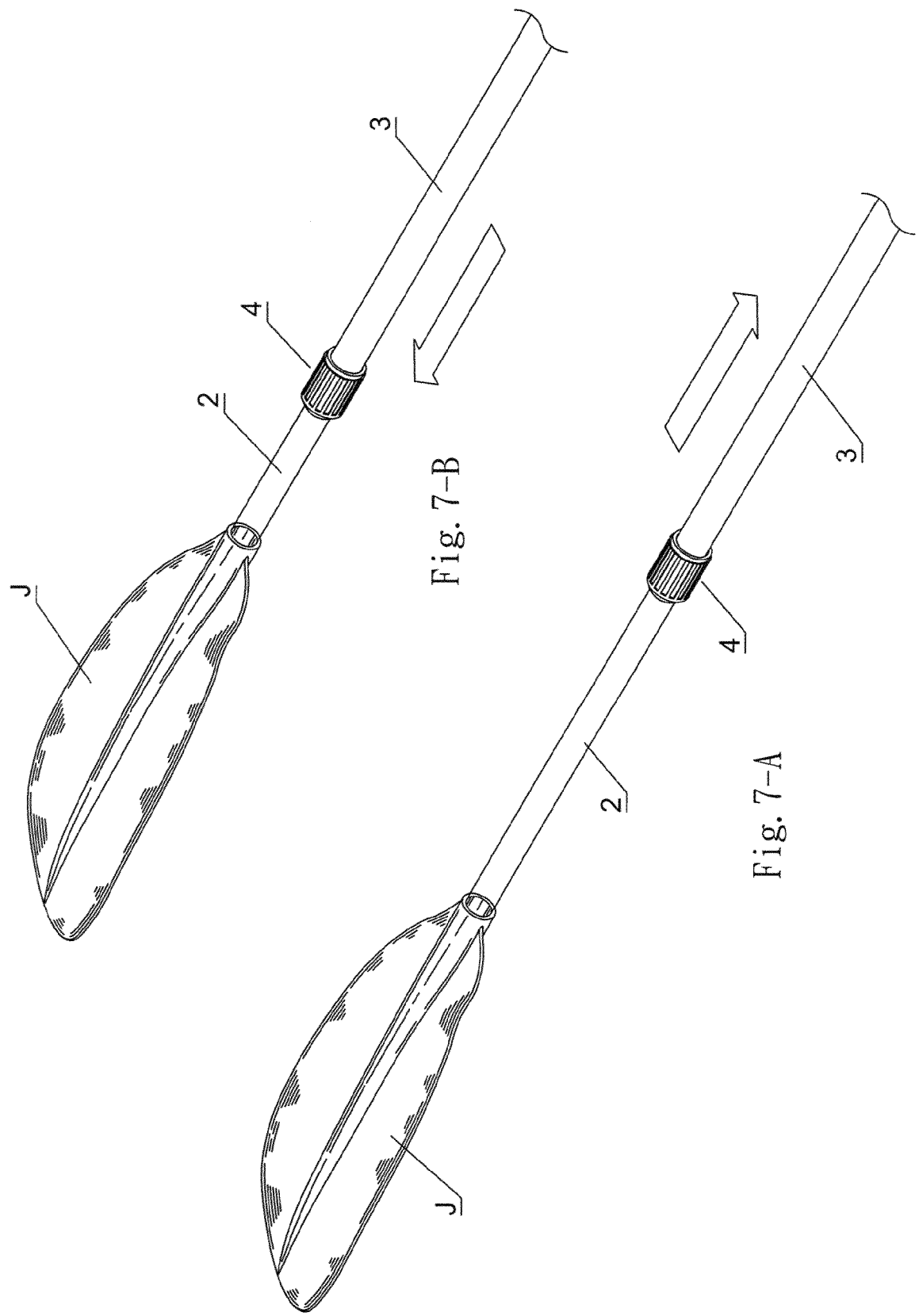
Fig. 7-A
Fig. 7-B

COUPLING STRUCTURE OF A TELESCOPIC ROD

BACKGROUND OF THE INVENTION

1. Field of the Invention

The present invention relates to a coupling structure of a telescopic rod, and more particularly to a telescopic rod structure having a C-shaped sleeve therein for changing the telescopic rod in a fixed state or in an adjustable and for enhancing the steadiness and control of the telescopic rod which is composed of two tubes.

2. Description of the Prior Art

A conventional telescopic rod is composed of an inner tube and an outer tube which are connected together with a positioning device. The inner and outer tubes of the telescopic rod are controlled by turning a rotatable lid clockwise or counterclockwise to extend or to retract. There is a gap between the inner tube and the outer tube for extension or retraction of the inner tube with respect to the outer tube. It is not easy to have a precise gap. As usual, the gap is in the range of a specified tolerance. If the tolerance of the gap is large, the telescopic rod is extended or retracted with ease. But, the inner tube and the outer tube of the telescopic rod are shaken easily to cause the telescopic rod in an unstable state or in a loosened state. When the telescopic rod is extended more, the unsteadiness of the telescopic rod is getting worse. On the contrary, if the tolerance of the gap is small, the telescopic rod has a better steadiness. But, the friction coefficient of the two tubes is increased and it is difficult to extend or retract the inner tube with respect to the outer tube. It is not easy for the telescopic rod to have a fine adjustment.

SUMMARY OF THE INVENTION

According to the present invention, there is provided a coupling structure of a telescopic rod, comprising an inner tube, an outer tuber having an outer threaded section at an upper end thereof, and a positioning device to change the telescopic rod in a fixed state or in an adjustable state, the positioning device comprising a rotatable lid, a resilient sleeve, and a C-shaped sleeve, the rotatable lid in a cylinder shape having a central accommodating space and a reduced opening at an upper end thereof, the resilient sleeve having a central through hole and an oblique portion at an upper end thereof;

the inner tube having an upper end coupled with a joint member and a lower end formed with an enlarged portion, the enlarged portion having an outer diameter which is slightly less than an inner diameter of the outer tube;

the C-shaped sleeve having a lip at an upper end thereof and a plurality of mini-ribs formed on an inner wall thereof;

thereby, the C-shaped sleeve being located between the upper end of the outer tube and an underside of a metallic ring and attached to the inner tube for providing a non-slip effect, the mini-ribs having less resistance with respect to the inner tube for providing a fine adjustment when the inner tube is extended or retracted with respect to the outer tube, the enlarged portion of the inner tube being adapted to keep a gap between the inner tube and the outer tube, the rotatable lid being turned clockwise or counterclockwise for controlling the resilient sleeve, the metallic ring and the C-shaped sleeve to switch the inner tube in an adjustable state or in a fixed state.

Preferably, the joint member is one of canvas, a marine light, an oar, and a hook.

Preferably, the C-shaped sleeve is made of soft and resilient rubber material.

Preferably, the outer tube has a distal end formed with at least one retaining hole for limiting the inner tube.

Preferably, the metallic ring has a central hole and is located between the resilient sleeve and the C-shaped sleeve.

BRIEF DESCRIPTION OF THE DRAWINGS

FIGS. 6A, 6B are perspective views of a first embodiment of the present invention; and FIGS. 7A, 7B are perspective views of a second embodiment of the present invention; and

DETAILED DESCRIPTION OF THE PREFERRED EMBODIMENT

Figure 1:
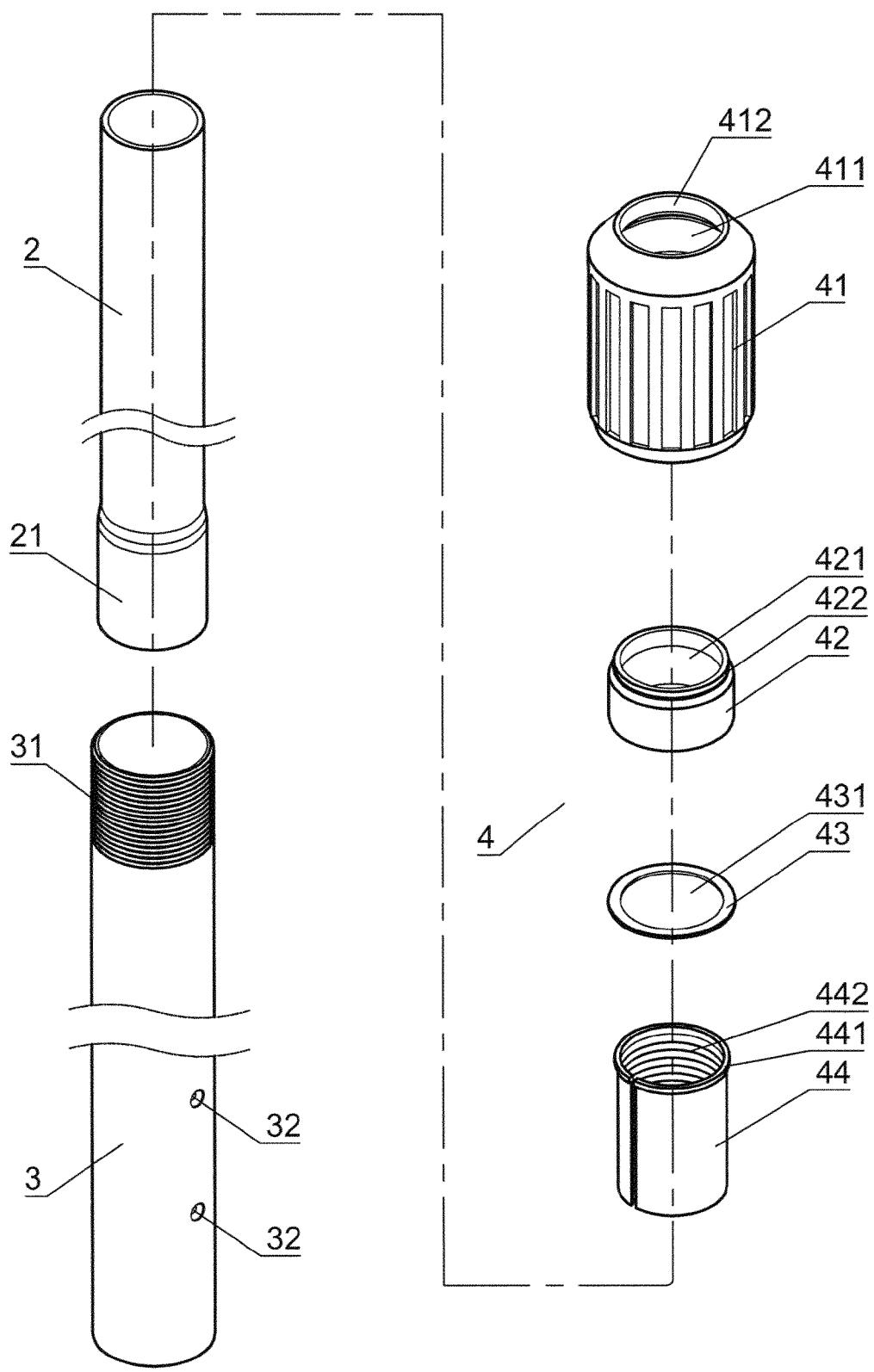
FIG. 1 is an exploded view of the present invention.
Figure 2:
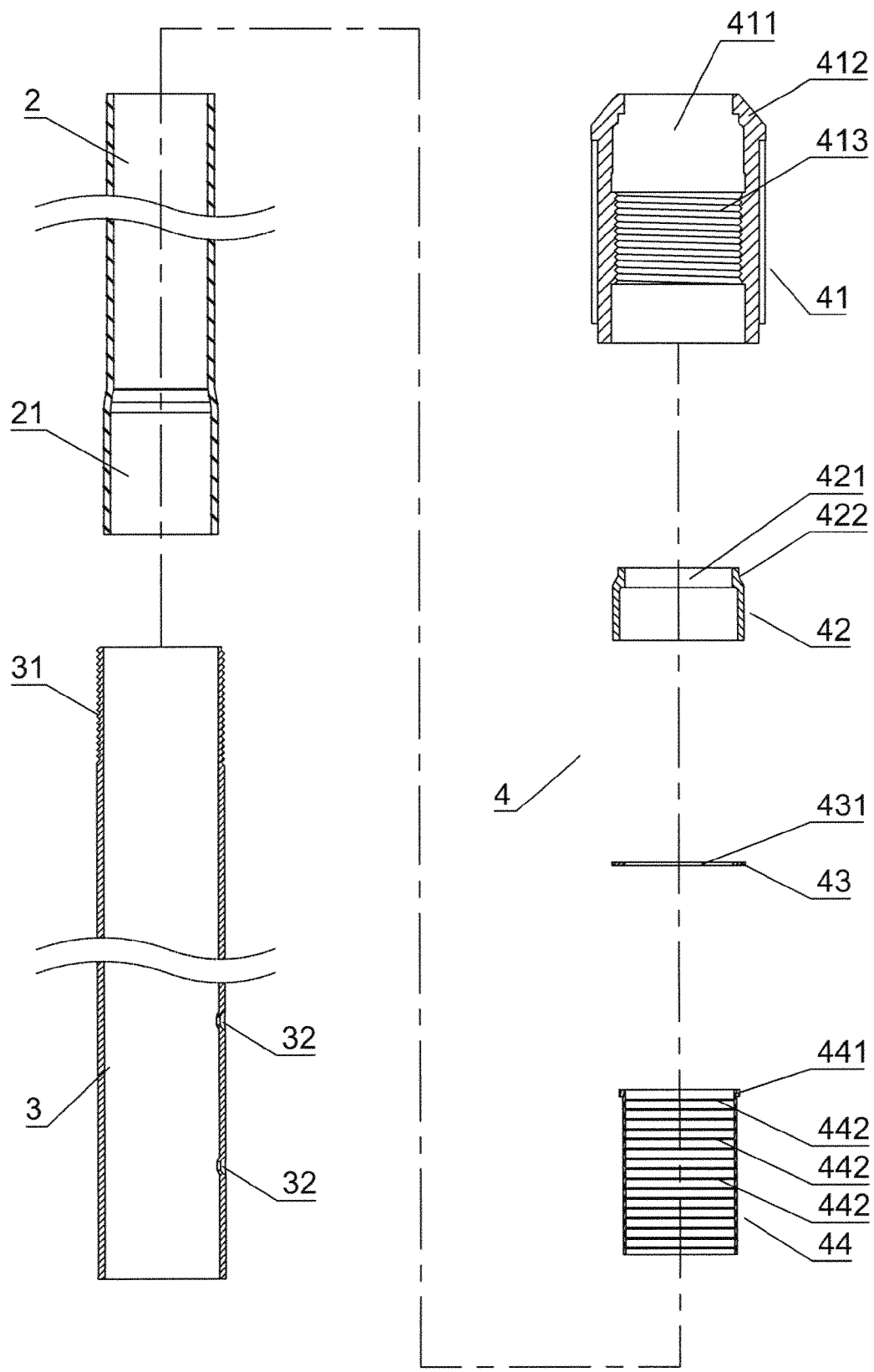
FIG. 2 is an exploded cross-sectional view of the present invention.

Embodiments of the present invention will now be described, by way of example only, with reference to the accompanying drawings.

As shown in FIGS. 1 to 4, a coupling structure of a telescopic rod according to a preferred embodiment of the present invention comprises an inner tube 2, an outer tube 3, and a positioning device 4. The inner tube 2 has an upper section coupled with a joint member J and a lower section inserted into the outer tube 3. The telescopic rod is controlled to extend outwardly or to retract inwardly with the positioning device 4.

The joint member J at the upper section of the inner tuber 2 can be canvas, a marine light, an oar, a hook or the like. The inner tube 2 has a distal end which is formed with an enlarged portion 21. The enlarged portion 21 has an outer diameter which is slightly less than an inner diameter of the outer tube 3 for cooperating with the outer tube 3 and the positioning device 4 to provide a steady limit effect.

The outer tube 3 has an outer threaded section 31 at an upper end thereof for connecting with a rotatable lid 41 of the positioning device 4. The lower section of the inner tube 2 is inserted into the outer tube 3 for extension or retraction. The outer tube 3 has a distal end formed with at least one retaining hole 32 to limit movement of the inner tube 2.

The positioning device 4 comprises the rotatable lid 41, a resilient sleeve 42, a metallic ring 43, and a C-shaped sleeve 44.

The rotatable lid 41 is in a cylinder shape. The rotatable lid 41 has a central accommodating space 411 for fitting on the upper end of the outer tube 3, a reduced opening 412 at an upper end thereof, and an inner threaded section 413 at an inner wall thereof for engaging with the outer threaded section 31 of the outer tube 3.

The resilient sleeve 42 is fitted into an upper section of the rotatable lid 41. The resilient sleeve 42 has a central through hole 421 for insertion of the inner tube 2 and an oblique portion 422 at an upper end thereof corresponding to the reduced opening 412 of the rotatable lid 41.

The metallic ring 43 has a central hole 431 for insertion of the inner tube 2 which is retracted into the outer tube 3. The metallic ring 43 is located between a lip 441 of the C-shaped sleeve 44 and a bottom of the resilient sleeve 42. The metallic ring 43 is not essential, depending on the demand.

The C-shaped sleeve 44 has the lip 441 at an upper end thereof to be located between the upper end of the outer tube 3 and an underside of the metallic ring 43 and a plurality of mini-ribs 442 formed on an inner wall thereof. The mini-ribs 442 are made of soft and resilient rubber material, providing a non-slip effect. When the inner tube is extended or retracted with respect to the outer tube, the mini-ribs 442 have less resistance because the contact surface is the plurality of ribs, which is convenient for a fine adjustment.

Figure 3:
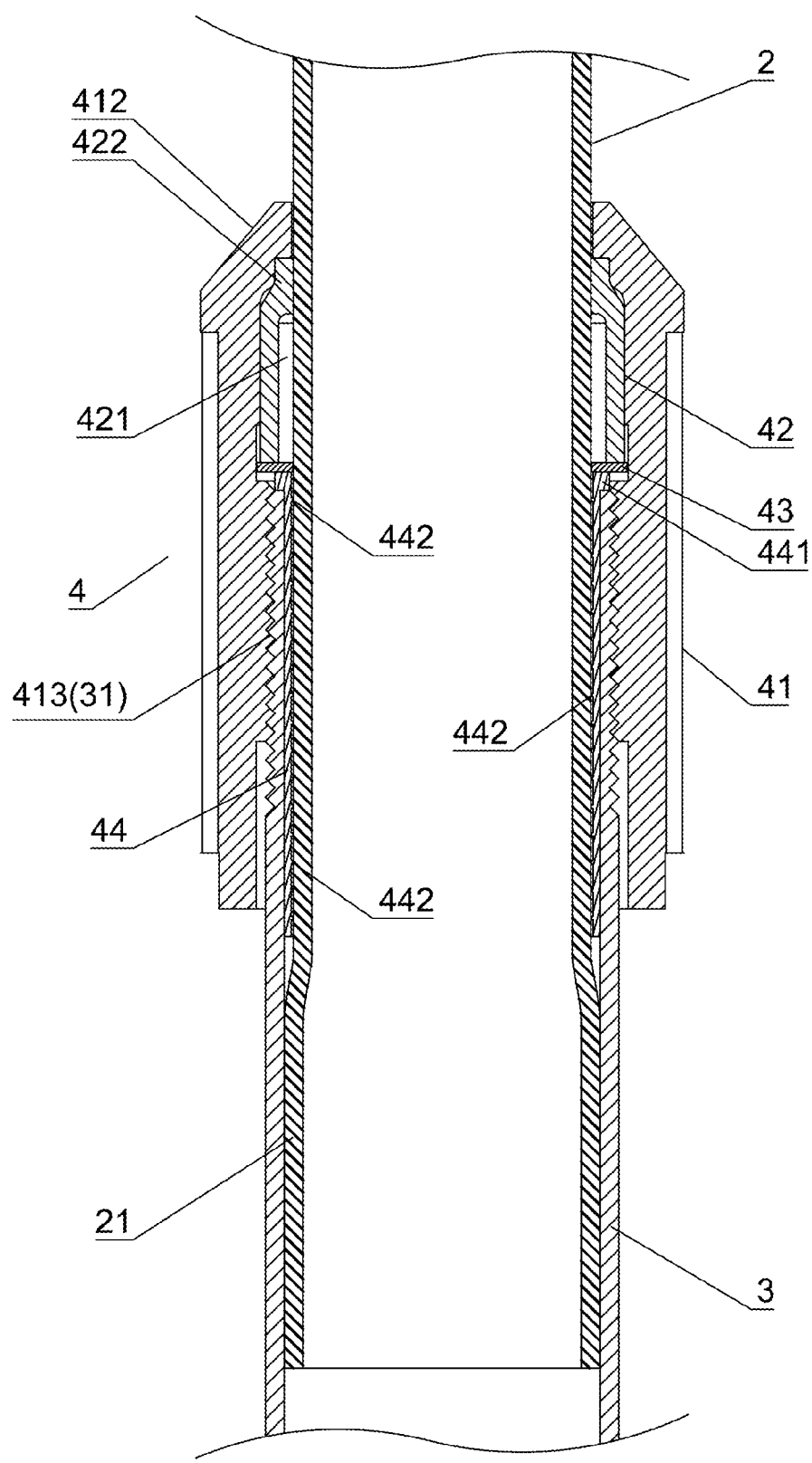
FIG. 3 is an assembled cross-sectional view of the present invention.
Figure 4:
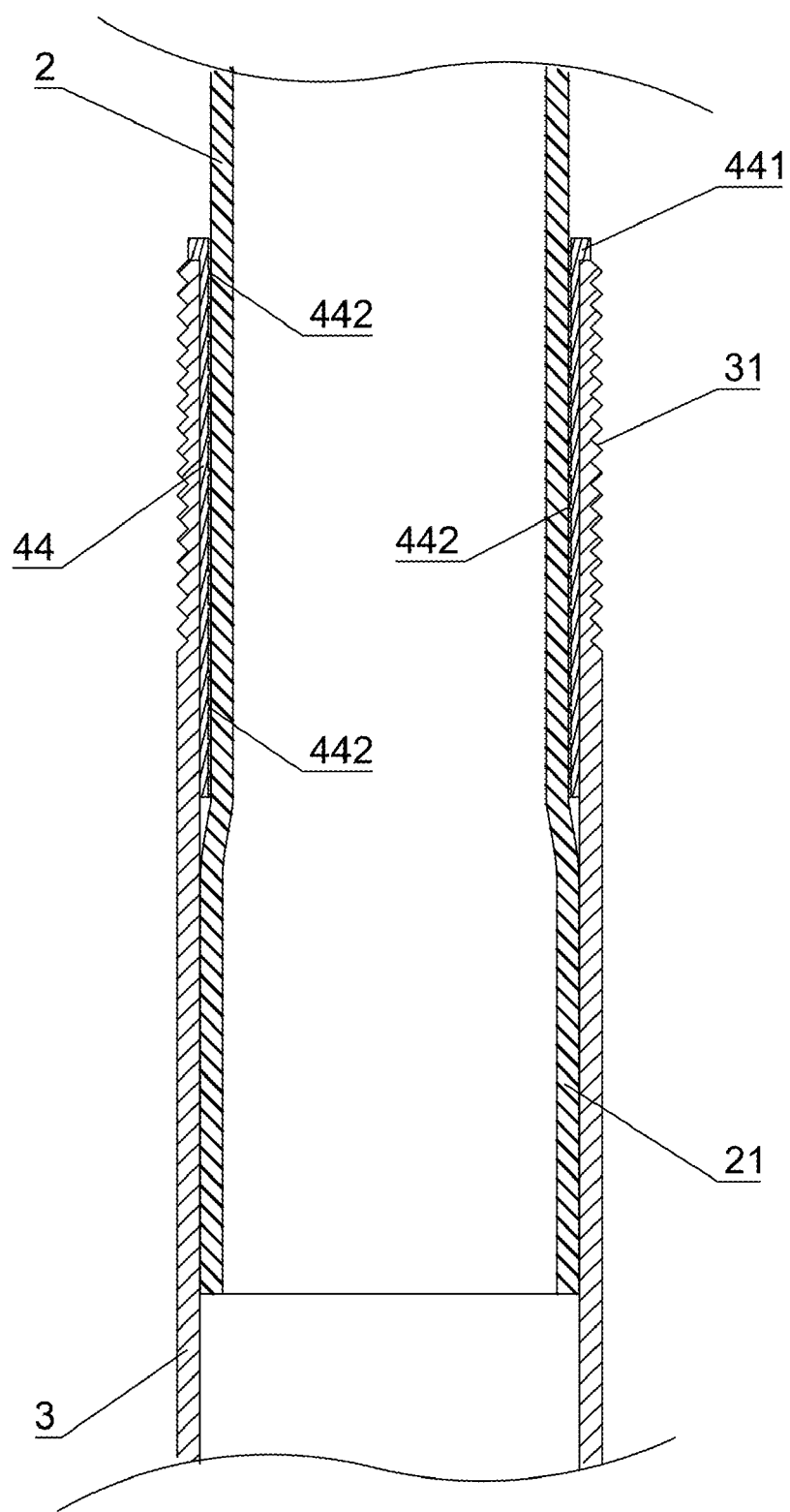
FIG. 4 is a cross-sectional view showing the connection of a C-shaped sleeve, an inner tube, and an outer tube of the present invention.

Referring to FIGS. 3 and 4, the rotatable lid 41 of the positioning device 4 is turned clockwise or counterclockwise for changing the inner tube 2 in a fixed state or in an adjustable state. When the rotatable lid 41 is turned counterclockwise to move upwardly and disengage from the outer tube 3 gradually, the metallic ring 43 urged by the resilient sleeve 42 will be loosened. The resilient sleeve 42 and the inner tube 2 are in a free state such that the inner tube 2 is moveable with respect to the outer tube 3. The C-shaped sleeve 44 is disposed on the upper end of the outer tube 3 to keep the inner tube 2 from deflecting. Furthermore, the C-shaped sleeve 44 has less resistance to the inner tube 2, providing a better extension and retraction, in particular, to cooperate with the enlarged portion 21 at the distal end of the inner tube 2. When the rotatable lid 41 is turned clockwise to move downwardly for fixing the inner tube 2, the metallic ring 43 urged by the outer tube 3 will compress the bottom of the resilient sleeve 42 to move upwardly. The oblique portion 422 is confined by the reduced opening 412 to tighten the inner tube 2 such that the inner tube 2 is fixed and the mini-ribs 442 on the inner wall of the C-shaped sleeve 44 are attached to the inner tube 2 to provide a non-slip effect, preventing the inner tube 2 from disengagement. There is a proper gap between the inner tube 2 and the outer tube 3 by means of the enlarged portion 21 at the distal end of the inner tube 2 so that the telescopic rod won't be shaken easily by an external force to loosen the positioning device. The present invention provides a convenient and easy way to extend or to retract the telescopic rod, which is useful and practical.

Figure 5:
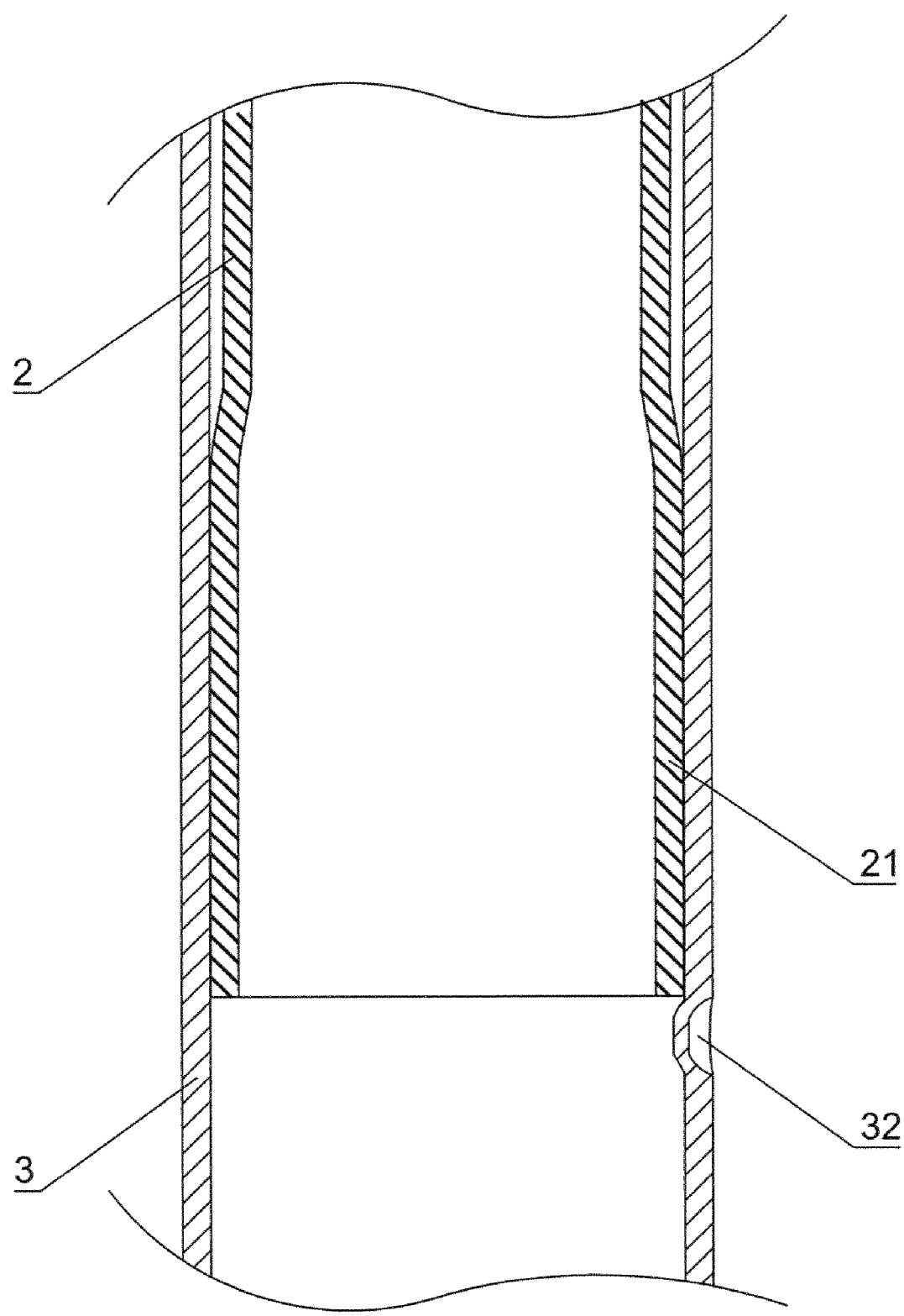
FIG. 5 is a cross-sectional view showing an enlarged section of the inner tube retained by a retaining hole of the present invention.

Referring to FIGS. 1 and 5, the enlarged portion 21 at the distal end of the inner tube 2 provides a limit effect to the inner tube 2. When the inner tube 2 is extended fully, the enlarged portion 21 will be held against the C-shaped sleeve 44 to stop the extension of the inner tube 2. When the inner tube 2 is retracted fully, the bottom of the enlarged portion 21 will be retained by the retaining hole 32, preventing the inner tube 2 disengaging from the outer tube 3. The outer diameter of the enlarged portion 21 is slightly less than the inner diameter of the outer tube 3, cooperating with the C-shaped sleeve 44 on the outer tube 3, the inner tube 2 is maintained in the outer tube 3, without deflection. In addition, when the inner tube 2 is fixed, the inner tube 2 won't be shaken easily, providing a steady effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A coupling structure of a telescopic rod, comprising:
   an inner tube;
   an outer tube slidingly received within the outer tube, the outer tube having an outer threaded section at an upper end thereof, wherein the inner tube having an upper end coupled with a joint member and a lower end formed with an enlarged portion, the enlarged portion having an outer diameter which is slightly less than an inner diameter of the outer tube; and
   a positioning device configured to change the telescopic rod between a fixed state and an adjustable state, the positioning device comprising:
      a rotatable lid in a cylinder shape having a central accommodating space and a reduced opening at an upper end thereof, the rotatable lid having an inner threaded section configured to engage the outer threaded section of the outer tube;
      a resilient sleeve having a central through hole and an oblique portion at an upper end thereof, the resilient sleeve being located between the inner tube and the rotatable lid, a lower end of the resilient sleeve abutting an upper surface of a metallic ring; and
      a C-shaped sleeve located within a gap between the inner and outer tubes, the C-shaped sleeve having a lip at an upper end of the C-shaped sleeve, the lip of the C-shaped sleeve abutting an underside of the metallic ring, and a plurality of mini-ribs formed on an inner wall of the C-shaped sleeve,
   wherein the lip when located between the upper end of the outer tube and the underside of the metallic ring and attached to the inner tube is configured to provide a non-slip effect to prevent accidental disengagement of the inner tube,
   wherein the mini-ribs when uncompressed having a low sliding resistance with respect to the inner tube selected to provide a fine adjustment when the inner tube is extended or retracted with respect to the outer tube, the enlarged portion of the inner tube being adapted to keep the gap between the inner tube and the outer tube, the rotatable lid being turned clockwise or counterclockwise for moving the resilient sleeve, the metallic ring and the C-shaped sleeve upward or downward to switch the inner tube between the adjustable state and the fixed state,
   wherein the coupling structure is configured so that when the rotatable lid is turned clockwise to move downwardly for fixing the inner tube, the metallic ring is urged by the outer tube to compress the bottom of the resilient sleeve to move upwardly and the oblique portion is confined by the reduced opening to tighten the inner tube such that the inner tube is fixed and the mini-ribs on the inner wall of the C-shaped sleeve are selectively attached to the inner tube to provide the non-slip effect, thereby preventing the inner tube from accidental disengagement while the C-shaped sleeve is compressed.

2. The coupling structure of a telescopic rod as claimed in claim 1, wherein the joint member is one of canvas, a marine light, an oar, and a hook.

3. The coupling structure of a telescopic rod as claimed in claim 1, wherein the C-shaped sleeve is made of soft and resilient rubber material.

4. The coupling structure of a telescopic rod as claimed in claim 1, wherein the outer tube has a distal end formed with at least one retaining hole for limiting the inner tube.

5. The coupling structure of a telescopic rod as claimed in claim 1, wherein the metallic ring has a central hole.

* * * * *